United States Patent [19]

Bell

[11] Patent Number: 5,278,230
[45] Date of Patent: Jan. 11, 1994

[54] POLYESTER/POLYAMIDE BLENDS WITH IMPROVED IMPACT RESISTANCE

[75] Inventor: William P. Bell, Jonesborough, Tenn.

[73] Assignee: Eastman Kodak Company, Rochester, N.Y.

[21] Appl. No.: 826,321

[22] Filed: Jan. 24, 1992

[51] Int. Cl.$^5$ .............................................. C08L 77/00
[52] U.S. Cl. ...................................... 525/66; 525/179
[58] Field of Search ................................. 525/66, 179

[56] References Cited

U.S. PATENT DOCUMENTS

| | | | |
|---|---|---|---|
| 3,047,539 | 7/1962 | Pengilly | 260/75 |
| 4,256,861 | 3/1981 | Davis et al. | 525/437 |
| 4,539,390 | 9/1985 | Jackson, Jr. et al. | 528/303 |
| 4,594,386 | 6/1986 | Olivier | 525/66 |
| 4,812,534 | 3/1989 | Blakely | 525/425 |
| 4,879,324 | 11/1989 | Lausberg et al. | 523/400 |
| 4,897,448 | 1/1990 | Romance | 525/67 |

FOREIGN PATENT DOCUMENTS

| | | |
|---|---|---|
| 0282153 | 9/1988 | European Pat. Off. . |
| 91/07467 | 5/1991 | World Int. Prop. O. . |

OTHER PUBLICATIONS

Patent Abstract of Japan, JP60137958, 1985, Iizaka Youji, et al.
D. Gilmore et al., *Proceedings of Antec*, pp. 1228-1233 (1990).
A. J. Oshinski et al., *Polym. Mater. Sci. Eng.*, 64, pp. 153-154 (1991).

*Primary Examiner*—Ana L. Carrillo
*Attorney, Agent, or Firm*—Betty J. James; William P. Heath, Jr.

[57] ABSTRACT

This invention relates to molding compositions comprising:

(a) from about 15 to about 85 percent by weight of a polyamide having an inherent viscosity of about 0.6 to about 2.5 dl/g, (b) from about 15 to about 85 percent by weight of a copolyester, having an inherent viscosity of about 0.5 to about 1.0 dl/g, comprising repeat units of terephthalic acid, ethylene glycol, and 1,4-cyclohexanedimethanol, and (c) from about 5 to about 30 percent by weight of a combination of at least two impact modifiers are selected from the group consisting of maleated and unmaleated ethylene-propylene rubbers wherein at least one said impact modifier is maleated.

9 Claims, No Drawings

POLYESTER/POLYAMIDE BLENDS WITH IMPROVED IMPACT RESISTANCE

FIELD OF THE INVENTION

This invention relates to blends of a polyamide, a polyester, and a combination of unmodified and maleated rubbers.

BACKGROUND OF THE INVENTION

Polyesters and polyamides are both widely used thermoplastic injection molding materials. Compatible blends of these polymers would be very useful since they would allow a designer to develop materials with specific properties in areas such as strength, toughness, chemical resistance and cost. Polyester/polyamide blends are generally incompatible, however, as evidenced by low impact strengths. Low impact strengths preclude the use of these blends in many large, structural parts. While impact modifiers well known in the art may be used to improve impact strength, they generally do not improve the impact strengths of polyester/polyamide blends. In particular, blends of polyamides and copolyesters based on terephthalic acid, ethylene glycol, and cyclohexanedimethanol are not usually used for injection molding applications since they usually have low impact strengths.

Other attempts have been made to improve the impact strengths of polyester/polyamide blends. For example, U.S. Pat. No. 4,812,534 describes the use of a copolyesteramide in minor amounts for improvement of the impact strength of polyester/polyamide blends. Also, D. Gilmore, J. Kirkpatrick, and M. J. Modic describe the use of mixtures of unmodified and maleated styrene-ethylene/butylene-styrene (SEBS) rubbers in Nylon 6, Nylon 66, polyphenylene-ether/propylene blends, polyphenylene-ether-Nylon 66 blends and polypropylene/Nylon 66 blends to improve impact strength as reported in *Proceedings of ANTEC,* (1990), pp. 1228-1233.

SUMMARY OF THE INVENTION

The problems noted above are overcome with the molding compositions of the present invention, comprising:

(a) from about 15 to about 85 percent by weight of a polyamide having an inherent viscosity of about 0.6 to about 2.5 dl/g, (b) from about 15 to about 85 percent by weight of a copolyester, having an inherent viscosity of about 0.5 to about 1.0 dl/g, comprising repeat units of terephthalic acid, ethylene glycol, and 1,4 cyclohexanedimethanol, and (c) from about 5 to about 30 percent by weight of a combination of at least two impact modifiers selected from the group consisting of maleated and unmaleated ethylene-propylene rubbers wherein at least one said impact modifier is maleated.

One of the advantages of the blends of the invention is that they have unexpectedly improved impact strengths.

DETAILED DESCRIPTION OF THE PREFERRED EMBODIMENTS

The molding compositions of the invention comprise components (a), (b), and (c), as follows:

Component (a) comprises from about 15 to about 85 percent by weight of a polyamide having an inherent viscosity of about 0.6 to about 2.5 dl/g.

The polyamide of component (a) may be any melt-processable polyamide homopolymer or copolymer. It may be obtained from an amino acid, a lactam, or a diamine and a dicarboxylic acid. Any polyamides are useful in this invention if they are polymers capable of being subjected to melt compounding and melt molding. They may be amorphous or crystalline.

Of the monomers used as raw materials for preparing the polyamide, the amino acid may include, for example, 6-aminocaproic acid, 11-aminoundecanoic acid, 12-aminododecanoic acid, paraminomethylbenzoic, etc.; the lactam may include, for example, $\epsilon$-caprolactam, $\epsilon$-laurolactam, etc.; and the diamine may include, for example, tetramethylenediamine, hexamethylenediamine, undecamethylenediamine, dodecamethylenediamine, 2,2,4-/2,4,4-trimethylhexamethylenediamine, 5-methylnonamethylenediamine methaxylylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, etc. The dicarboxylic acid may include, for example, adipic acid, suberic acid, azelaic acid, sebacic acid, dodecanoic diacid, terephthalic acid, isophthalic acid, 2-chloroterephthalic acid, 2-methylterephthalic acid, 5-methylisophthalic acid, 5-sodiumsulfoisophthalic acid, hexahydroterephthalic acid, hexahydroisophthalic acid, diglycolic acid, etc.

There is no particular limitation in the polymerization method, and any methods of normal-pressure polymerization and reduced-pressure polymerization can be used. Preferably, the polyamide is formed from the condensation reaction of bifunctional monomers (amino acids) or from the condensation of diamines and dibasic acids. of bifunctional monomers (amino acids) or from the condensation of diamines and dibasic acids.

Preferred polyamides as component (a) of this invention may include, for example, polycaproamide (Nylon 6), polyhexamethylene adipamide (Nylon 6,6), polyhexamethylene sebacamide (Nylon 6,10), polyundecamethylene adipamide (Nylon 11,6), polyhexamethylene dodecamide (Nylon 6,12), polyundecanamide (Nylon 11), polydodecanamide (Nylon 12), and a copolymerized polyamide or mixed polyamide of any of these. Nylon 6 and Nylon 66 are the most preferred polyamides within the context of this invention.

The polyamide of this inventio an inherent viscosity of about 0.6 to about 2.5 dl/g.

The compositions of this invention also comprise:

(b) from about 15 to about 85 percent by weight of a copolyester, having an inherent viscosity of about 0.5 to about 1.0 dl/g, comprising repeat units of terephthalic acid, ethylene glycol, and 1,4-cyclohexanedimethanol.

The polyester portion of the compositions of the present invention is prepared by conventional polycondensation procedures well known in the art. Examples of these processes can be found in U.S. Pat. Nos. 4,256,861, 4,539,390, and 3,047,539 and include preparation by direct condensation or by ester interchange. Preferably, the polyesters are prepared by ester interchange which, in brief, involves first reacting the dicarboxylic acid with an alcohol to form a diester, such as dimethyl terephthalate. The diester is then ester interchanged with a diol to form a bis ester, such as bis 2-hydroxyethyl terephthalate, which is condensed at low pressure and high temperature to form the polyester. The condensation reaction is allowed to continue until a desired inherent viscosity is obtained.

The dicarboxylic acid component of the copolyester may contain up to about 10 mol % of other conventional aromatic, aliphatic or alicyclic dicarboxylic acids such as isophthalic acid, naphthalenedicarboxylic acid, cyclohexanedicarboxylic acid, succinic acid, sebacic acid, adipic acid, glutaric acid, azelaic acid and the like.

The glycol component mixture of ethylene glycol and 1,4-cyclohexanedimethanol may also contain up to about 10 mol % of other conventional aliphatic or alicyclic glycols such as diethylene glycol, triethylene glycol, propanediol, butanediol, pentanediol, hexanediol, tetramethylcyclobutanediol and the like. The glycol component may contain from about 15 to about 85 mole % ethylene glycol, the remainder preferably being cyclohexanedimethanol.

The polyesters and copolyesters described above should have an inherent viscosity of from about 0.5 to about 1.0 dl/g. Preferably, the inherent viscosity of the polyester or copolyester should range being from about 0.7 to about 0.8 dl/g.

The compositions of the invention further comprise:

(c) from about 5 to about 30 percent by weight of a combination of at least two impact modifiers selected from the group consisting of maleated and unmaleated ethylene-propylene rubbers wherein at least one impact modifier is maleated. As used herein, the term "maleated" is defined as being functionalized with maleic anhydride. Ethylene-propylene rubbers are amorphous random ethylene-propylene copolymers which are prepared to a high molecular weight. The ratio of ethylene to propylene usually varies from about 40:60 to about 60:40. They are commercially available from a number of sources, an example of which is Polysar 306 from Polysar, Inc. An example of a maleated ethylene-propylene rubber is Exxelor VA1803 from Exxon Chemicals.

The ratio of unmodified to maleated rubber may range from about 1:10 to about 10:1.

The ratio of unmaleated to maleated rubber may range from about 1:4 to about 4:1.

The compositions of the invention can optionally contain reinforcing materials such as glass fibers, metal fibers, graphite fibers, aramid fibers, glass beads, aluminum silicate, asbestos, mica, talc, calcium carbonate, silica, or mixtures thereof.

The compositions may also contain colorants, plasticizers, extenders, lubricants, oxidation inhibitors, stabilizers, crystallization aids, mold releases, flame retardants, nucleating agents, ultraviolet light and heat stabilizers, and the like, which are compatible with the components of the blend and do not distort the usefulness of the final products. These additives are added in amounts known in the art to effect desired improvements in properties.

The compositions of this invention are prepared by blending the components together by any convenient means to obtain an intimate blend. For example the polyester, polyamide, and combination of maleated and unmaleated ethylene-propylene rubbers can be mixed dry in any suitable blender or tumbler with the other components and the mixture melt extruded. The extrudate can be chopped. If desired, the reinforcing material, if used, can be omitted initially and added after a first melt extrusion, and the resulting mixture can then be melt extruded. The product is especially suitable as an injection molding composition for producing molded articles.

Molding of the compositions of this invention may be carried out by methods such as injection molding, compression molding, transfer molding and the like, whereby a molded product having superior mechanical properties can be obtained. whereby a molded product having superior mechanical properties can be obtained.

The following examples are for illustrative purposes only, and not to limit the scope of the invention. All percentages are by weight, unless otherwise specified.

As used herein, inherent viscosity (I.V.) is measured at 25° C. using 0.50 gram of polymer per 100 mL of a solvent consisting of 60 weight percent phenol and 40 weight percent tetrachloroethane.

EXAMPLES

EXAMPLE 1

Capron 8200, a Nylon 6 commercially available from Allied Chemical Company, and PCTG 5445, a copolyester of terephthalic acid with ethylene glycol (about 35 mole %) and 1,4-cyclohexanedimethanol (about 65 mole %) were blended at a 1:1 ratio with a total of 20 wt. % impact modifier. The impact modifier portion of the compositions consisted of a mixture of Polysar 306, an unmodified EP rubber from Polysar, Inc., and Exxelor VA1083, a maleated EP rubber from Exxon Chemicals. The composition of the impact modifier was varied from pure Polysar 306 to pure Exxelor VA1803. These materials were melt blended on a Werner & Pfleiderer ZSK-28 twin screw extruder using a screw configuration designed to give high intensity mixing. The blends were then molded on a Toyo 90 injection molding machine. The compositions of these blends, their processing conditions, and selected mechanical properties are shown in Table 1. The experimental results show unexpectedly high notched Izod impact strengths at 23° C. for blends containing the mixture of impact modifiers. These values are higher than those obtained for a blend containing 20 wt. % of either modifier singly.

EXAMPLE 2

Blends similar to those of Example 1 were prepared, except an extruder screw designed to provide only a medium level of mixing was used (Table 2). Exceptionally high impact strengths are obtained again for the rubber mixtures, which are unexpectedly much higher than values for the modifiers individually.

EXAMPLE 3 Comparative

Table 3 shows results for mixtures of the SEBS modifiers of the type used by Gilmore in the copolyester/Nylon 6 blends of examples 1 and 2. Kraton G1651 (Shell Chemical Co.) is a styrene/ethylene co-butylene triblock copolymer and Kraton FG1901X is a similar material, but maleated. Low notched Izod impact strengths are obtained, regardless of whether the impact modifiers are used singly or in combination.

EXAMPLE 4

Table 4 shows the properties of blends of PCTG 5445 and Zytel 101 (Nylon 66) containing the same impact modifiers as described in Example 1. In this case, unexpectedly high notched Izod impact strengths are again found for compositions containing the mixture of impact modifiers.

TABLE 1

EPR Impact Modifiers in PCTG 5445/Nylon 6 Blends

| COMPOSITION | | | | | | |
|---|---|---|---|---|---|---|
| Wt. % Capron 8200 | 40 | 40 | 40 | 40 | 40 | 40 |
| Wt. % PCTG 5445 | 40 | 40 | 40 | 40 | 40 | 40 |
| Wt. % Polysar 306 | 0 | 4 | 8 | 12 | 16 | 20 |
| Wt. % Exxelor VA1803 | 20 | 16 | 12 | 8 | 4 | 0 |
| PROCESSING | | | | | | |
| Screw intensity | High | High | High | High | High | High |
| Extrusion temp (°C.) | 260 | 260 | 260 | 260 | 260 | 260 |
| Molding temp (°C.) | 260 | 260 | 260 | 260 | 260 | 260 |
| Mold temp (°C.) | 23 | 23 | 23 | 23 | 23 | 23 |
| Cycle time (sec) | 35 | 35 | 35 | 35 | 35 | 35 |
| PROPERTIES | | | | | | |
| Density, after molding (g/cm$^3$) | 1.099 | 1.100 | 1.097 | 1.094 | 1.085 | 1.086 |
| Break elongation (%) | 319 | 322 | 279 | 211 | 169 | 137 |
| Tensile strength (10$^3$ psi) | 6.0 | 5.6 | 5.7 | 5.3 | 4.9 | 5.2 |
| Flexural strength (10$^3$ psi) | 4.6 | 4.8 | 4.8 | 4.9 | 5.0 | 5.1 |
| Flexural modulus (10$^5$ psi) | 1.2 | 1.3 | 1.3 | 1.4 | 1.4 | 1.5 |
| Notched Izod @ 23° C. (ft-lb/in) | 3.8 | 4.5 | 18.9 | 17.5 | 7.1 | 1.6 |
| Notched Izod @ −40° C. (ft-lb/in) | 1.5 | 1.7 | 2.0 | 2.3 | 1.2 | 1.1 |
| Unnotched Izod @ 23° C. (ft-lb/in) | 32.0 | 34.7 | 31.6 | 29.8 | 27.7 | 28.7 |
| Unnotched Izod @ −40° C. (ft-lb/in) | 37.0 | 34.6 | 41.8 | 39.6 | 30.8 | 38.4 |

TABLE 2

EPR Impact Modifiers in PCTG 5445/Nylon 6 Blends

| COMPOSITION | | | | | | |
|---|---|---|---|---|---|---|
| Wt. % Capron 8200 | 40 | 40 | 40 | 40 | 40 | 40 |
| Wt. % PCTG 5445 | 40 | 40 | 40 | 40 | 40 | 40 |
| Wt. % Polysar 306 | 20 | 16 | 12 | 8 | 4 | 0 |
| Wt. % Exxelor VA1803 | 0 | 4 | 8 | 12 | 16 | 20 |
| PROCESSING | | | | | | |
| Screw intensity | Medium | Medium | Medium | Medium | Medium | Medium |
| Extrusion temp (°C.) | 260 | 260 | 260 | 260 | 260 | 260 |
| Molding temp (°C.) | 260 | 260 | 260 | 260 | 260 | 260 |
| Mold temp (°C.) | 23 | 23 | 23 | 23 | 23 | 23 |
| Cycle time (sec) | 40 | 40 | 40 | 40 | 40 | 40 |
| PROPERTIES | | | | | | |
| Density, after molding (g/cm$^3$) | 1.090 | 1.091 | 1.102 | 1.101 | 1.102 | 1.102 |
| Break elongation (%) | 164 | 335 | 402 | 396 | 383 | 370 |
| Tensile strength (10$^3$ psi) | 5.3 | 5.8 | 6.0 | 5.8 | 5.7 | 5.8 |
| Flexural strength (10$^3$) | 5.4 | 5.2 | 5.1 | 5.1 | 5.0 | 5.0 |
| Flexural modulus (10$^5$ psi) | 1.6 | 1.5 | 1.4 | 1.4 | 1.3 | 1.3 |
| Notched Izod @ 23° C. (ft-lb/in) | 0.8 | 8.6 | 19.6 | 20.3 | 10.5 | 0.5 |
| Notched Izod @ −40° C. (ft-lb/in) | 0.9 | 1.0 | 1.1 | 1.4 | 1.3 | 1.0 |
| Unnotched Izod @ 23° C. (ft-lb/in) | 30.0 | 29.7 | 31.9 | 32.0 | 31.9 | 32.1 |
| Unnotched Izod @ −40° C. (ft-lb/in) | 38.5 | 36.8 | 40.8 | 44.3 | 45.0 | 37.0 |

TABLE 3

SEBS Impact Modifiers in PCTG 5445/Nylon 6 Blends

| COMPOSITION | | | | |
|---|---|---|---|---|
| Wt. % PCTG 5445 | 40 | 40 | 40 | 40 |
| Wt. % Capron 8200 | 40 | 40 | 40 | 40 |
| Wt. % Kraton G1651 | 20 | 8 | 4 | 0 |
| Wt. % Kraton FG1901X | 0 | 12 | 16 | 20 |
| PROCESSING | | | | |
| Screw intensity | Medium | Medium | Medium | Medium |
| Extrusion temp (°C.) | 260 | 260 | 260 | 260 |
| Molding temp (°C.) | 265 | 265 | 265 | 265 |
| Mold temp (°C.) | 23 | 23 | 23 | 23 |
| Cycle time (sec) | 35 | 35 | 35 | 35 |
| PROPERTIES | | | | |
| Density, after molding (g/cm$^3$) | 1.111 | 1.115 | 1.114 | 1.115 |
| Break elongation (%) | 414 | 345 | 76 | 14 |
| Tensile strength (10$^3$ psi) | 6.1 | 5.0 | 4.6 | 4.0 |
| Flexural strength (10$^3$) | 5.5 | 5.5 | 5.5 | 5.0 |
| Flexural modulus (10$^5$ psi) | 1.5 | 1.5 | 1.4 | 1.4 |
| Notched Izod @ 23° C. (ft-lb/in) | 0.9 | 0.7 | 0.5 | 0.6 |
| Notched Izod @ −40° C. (ft-lb/in) | 0.5 | 0.7 | 0.5 | 0.4 |
| Unnotched Izod @ 23° C. (ft-lb/in) | 27.7 | 31.5 | 30.9 | 29.2 |
| Unnotched Izod @ −40° C. (ft-lb/in) | 37.0 | 27.9 | 15.7 | 15.8 |

TABLE 4

EPR Impact Modifiers in PCTG 5445/Nylon 66 Blends

| COMPOSITION | | | | |
|---|---|---|---|---|
| Wt. % Zytel 101 | 40 | 40 | 40 | 40 |
| Wt. % PCTG 5445 | 40 | 40 | 40 | 40 |
| Wt. % Polysar 306 | 0 | 8 | 12 | 20 |
| Wt. % Exxelor VA1803 | 20 | 12 | 8 | 0 |
| PROCESSING | | | | |
| Screw intensity | High | High | High | High |
| Extrusion temp (°C.) | 260 | 260 | 260 | 260 |
| Molding temp (°C.) | 290 | 290 | 290 | 290 |
| Mold temp (°C.) | 23 | 23 | 23 | 23 |
| Cycle time (sec) | 35 | 35 | 35 | 35 |
| PROPERTIES | | | | |
| Density, after molding (g/cm$^3$) | 1.093 | 1.097 | 1.095 | 1.080 |
| Break elongation (%) | 61 | 117 | 122 | 9 |
| Tensile strength (10$^3$ psi) | 5.2 | 5.2 | 5.2 | 5.7 |
| Flexural strength (10$^3$ psi) | 5.5 | 5.8 | 5.8 | 6.2 |
| Flexural modulus (10$^5$ psi) | 1.6 | 1.7 | 1.6 | 1.8 |
| Notched Izod @ 23° C. (ft-lb/in) | 7.8 | 14.7 | 15.0 | 0.8 |
| Notched Izod @ −40° C. (ft-lb/in) | 2.2 | 2.4 | 2.3 | 0.8 |
| Unnotched Izod @ 23° C. (ft-lb/in) | 31.1 | 33.3 | 33.0 | 26.2 |
| Unnotched Izod @ −40° C. (ft-lb/in) | 33.3 | 33.3 | 37.8 | 25.4 |

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A molding composition comprising:
   (a) from about 15 to about 85 percent by weight of a polyamide having an inherent viscosity of about 0.6 to about 2.5 dL/g,
   (b) from about 15 to about 85 percent by weight of a copolyester, having an inherent viscosity of about 0.5 to about 1.0 dL/g, comprising repeat units of terephthalic acid, ethylene glycol, and 1,4-cyclohexanedimethanol, and
   (c) from about 5 to about 30 percent by weight of a combination of at least two impact modifiers selected from the group consisting of maleated and unmaleated ethylene-propylene rubbers wherein at least one of said impact modifiers is maleated and at least one of said impact modifiers is unmaleated, and further wherein said inherent viscosity of components (a) and (b) is measured at 25° C. using 0.50 grams of polymer per 100 mL of a solvent consisting of 60 weight percent phenol and 40 weight percent tetrachloroethane.

2. The composition of claim 1 wherein the copolyester portion comprises from about 40 percent to about 60 percent by weight of the total composition.

3. The composition of claim 1 wherein the ratio of unmaleated and maleated ethylene/propylene rubber ranges from 1:10 to 10:1.

4. The composition of claim 3 further wherein the ratio of unmaleated to maleated ethylene/propylene rubber ranges from 1:4 to 4:1.

5. The composition of claim 1 wherein the polyamide is Nylon 6 or Nylon 6,6.

6. The composition of claim 1 wherein the glycol content of the copolyester comprises about 25 mole percent to about 75 mole percent 1,4-cyclohexanedimethanol and about 75 mole percent to about 25 mole percent ethylene glycol.

7. The composition of claim 1 wherein the glycol content of the copolyester comprises about 60 mole percent to about 70 mole percent 1,4-cyclohexanedimethanol and about 40 mole percent to about 30 mole percent ethylene glycol.

8. The composition of claim 1 wherein the copolyester comprises repeat units derived from minor amounts of other dicarboxylic acids singly, or in combination with other glycols.

9. The composition of claim 1 wherein the notched Izod impact strength of said blend is greater than 1 ft-lb/in at −40° C. and greater than 4 ft-lb/in at 23° C. as measured by ASTM D256 using ⅛ inch molded bars.

* * * * *